US012809412B2

(12) United States Patent
Murakami et al.

(10) Patent No.: US 12,809,412 B2
(45) Date of Patent: Nov. 24, 2026

(54) SCANNING CONTROL DEVICE

(71) Applicant: TOYOTA JIDOSHA KABUSHIKI KAISHA, Toyota (JP)

(72) Inventors: Yukinori Murakami, Toyota (JP); Yuma Miyamoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 266 days.

(21) Appl. No.: 18/597,115

(22) Filed: Mar. 6, 2024

(65) Prior Publication Data

US 2025/0028345 A1 Jan. 23, 2025

(30) Foreign Application Priority Data

Jul. 18, 2023 (JP) ................................ 2023-117064

(51) Int. Cl.
*G05F 1/67* (2006.01)
*H02J 7/35* (2006.01)
*H02J 105/37* (2026.01)

(52) U.S. Cl.
CPC .................. *G05F 1/67* (2013.01); *H02J 7/35* (2013.01); *H02J 2105/37* (2026.01)

(58) Field of Classification Search
CPC . G05F 1/67; H02J 7/35; H02J 2105/37; H02J 3/48; H02J 2105/33; H02J 1/14; H02J 2101/25; H02J 7/34; H04M 3/365; H04M 2203/5045; H03J 1/0025; H04B 7/0426; H04B 10/07955; H04B 10/806; H03F 2200/465; H04L 9/003; H05K 7/1457; H05K 7/2089; H04Q 1/03; H05G 1/265; H01M 8/04604; H01R 12/7088; H04N 25/709; H04N 1/00885; H04J 14/0221;
(Continued)

(56) References Cited

U.S. PATENT DOCUMENTS

| | | | | |
|---|---|---|---|---|
| 9,644,993 | B2 * | 5/2017 | Adest | G01D 4/004 |
| 11,342,783 | B2 * | 5/2022 | Miyamoto | G05F 1/67 |
| 2020/0280207 | A1 | 9/2020 | Miyamoto et al. | |

FOREIGN PATENT DOCUMENTS

| | | | | |
|---|---|---|---|---|
| CN | 104656616 B | * | 2/2017 | |
| JP | 2014038567 A | * | 2/2014 | |
| JP | 2014-081669 A | | 5/2014 | |

(Continued)

*Primary Examiner* — Monica Lewis
*Assistant Examiner* — Jared Raymond Hausman
(74) *Attorney, Agent, or Firm* — SoraIP, Inc.

(57) ABSTRACT

In a solar module including a solar panel and a power generation control unit, a scanning control device includes an acquisition unit that acquires information on power generation of the solar panel, a setting unit that sets a target power that is a target value of power generated by the solar panel based on information on power generation of the solar panel, and an instruction unit that permits execution of a scanning process by the power generation control unit when a difference between the target power and the power generated by the solar panel is larger than a first threshold value, and prohibits execution of a scanning process by the power generation control unit when the difference is equal to or less than the first threshold value, and the setting unit changes a target power that is set in accordance with a change in information on power generation.

6 Claims, 2 Drawing Sheets

(58) Field of Classification Search
CPC ........ H03B 2200/0082; H03M 1/0845; H03M 7/6047; H02S 40/32
See application file for complete search history.

(56) References Cited

FOREIGN PATENT DOCUMENTS

| | | | | | |
|---|---|---|---|---|---|
| JP | 2020-141545 | A | | 9/2020 | |
| JP | 7119664 | B2 | * | 8/2022 | |
| KR | 101598464 | B1 | * | 3/2016 | G05F 1/67 |
| KR | 101615747 | B1 | * | 5/2016 | H02S 50/00 |
| KR | 20200090686 | A | * | 7/2020 | H02S 40/32 |
| WO | WO-2012097325 | A2 | * | 7/2012 | H02M 7/48 |

* cited by examiner

SCANNING CONTROL DEVICE

CROSS-REFERENCE TO RELATED APPLICATION

This application claims priority to Japanese Patent Application No. 2023-117064 filed on Jul. 18, 2023, incorporated herein by reference in its entirety.

BACKGROUND

1. Technical Field

The present disclosure relates to scanning control devices included in solar charging systems mounted on vehicles etc.

2. Description of Related Art

Japanese Unexamined Patent Application Publication No. 2020-141545 (JP 2020-141545 A) discloses an in-vehicle solar charging system provided with solar panels. In the solar charging system described in JP 2020-141545 A, each solar control device performs Maximum Power Point Tracking (MPPT) control on a corresponding one of the solar panels. In this MPPT control, in order to accurately find a maximum power point when the output voltage of a solar panel changes due to an environmental change such as a change in solar radiation condition, a scanning process for scanning the output voltage of the solar panel is executed to find an optimum point on a power-voltage (P-V) curve.

SUMMARY

In the solar charging system described in JP 2020-141545 A, the maximum power of the solar panel that is desired to be eventually obtained in the scanning process is set in advance as target power of the control. The maximum power of the solar panel, namely the target power, is derived as a fixed value based on a standard value of the solar panel etc.

The maximum power a solar panel can generate changes constantly depending on the environment in which the solar panel is installed, such as solar radiation condition and outside temperature. Therefore, in the solar charging system described in JP 2020-141545 A that performs control using the fixed target power, the scanning process is executed if the power generated by the solar panel deviates from the target power even when the solar power is generating power in an ideal manner according to the changing environment and there is no need to execute the scanning process. Since the power that can be obtained during the scanning process is smaller than the power that can be obtained during normal power generation, excessively executing the scanning process reduces the overall power generation efficiency of the solar charging system.

The present disclosure was made in view of the above issue, and it is an object of the present disclosure to provide a scanning control device that can suitably control execution of a scanning process to improve the overall power generation efficiency of a solar charging system.

In order to solve the above issue, an aspect of a technique of the present disclosure is a scanning control device that controls a scanning process in a solar module, the solar module including a solar panel and a power generation control unit configured to control power generation of the solar panel, and the scanning process being a process in which the power generation control unit scans an output voltage of the solar panel to find a maximum power point, the scanning control unit including:

an acquisition unit configured to acquire information on the power generation of the solar panel;

a setting unit configured to set target power based on the information on the power generation of the solar panel, the target power being a target value of power that is generated by the solar panel; and an instruction unit configured to allow the power generation control unit to execute the scanning process when a difference between the target power and power generated by the solar panel is larger than a first threshold value, and configured to prohibit the power generation control unit from executing the scanning process when the difference is equal to or less than the first threshold value, wherein the setting unit is configured to change the target power according to a change in the information on the power generation.

According to the scanning control device of the present disclosure, since the target value of the power that is generated by the solar panel is set based on the information on the power generation of the solar panel, the frequency of executing the scanning process can be reduced, and the overall power generation efficiency of the solar charging system can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The scanning control device of the present disclosure variably sets the target power generated by the solar panel based on the temperature of the solar panel or the like, and reduces a deviation between the power that can be generated by the solar panel in an actual environment and the target power. The scanning control device of the present disclosure reduces the frequency of execution of a scanning process in which the amount of power generation is reduced in this manner. This improves the power generation efficiency of the entire solar charging system.

Hereinafter, an embodiment of the present disclosure will be described in detail with reference to the drawings.

Embodiment

Configuration

Figure 1:
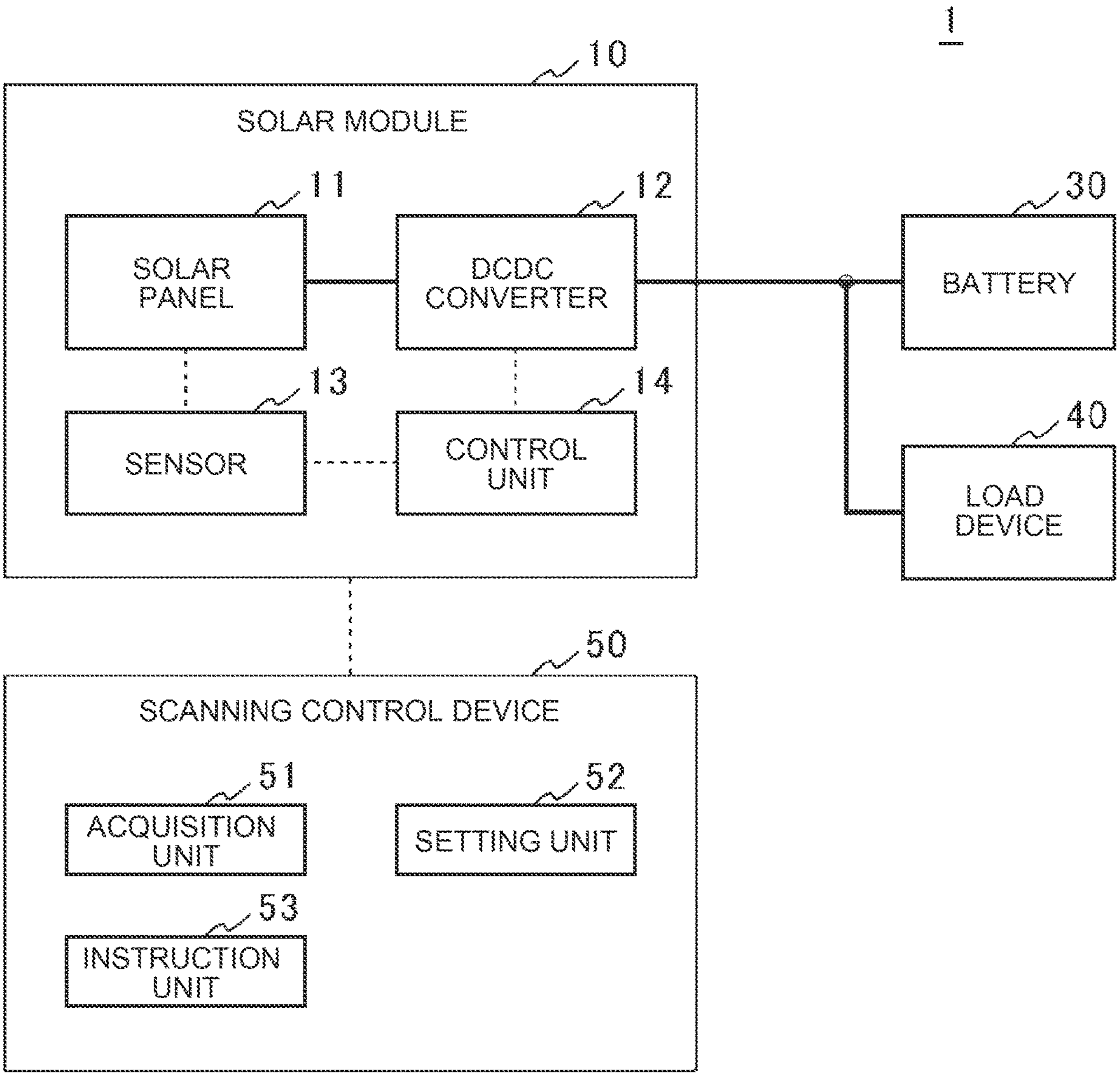
FIG. 1 is a block diagram illustrating an exemplary configuration of a solar charging system including a scanning control device according to an embodiment of the present disclosure.

FIG. 1 is a block diagram illustrating a schematic configuration of a solar charging system 1 including a scanning control device 50 according to an embodiment of the present disclosure. The solar charging system 1 illustrated in FIG. 1 includes a solar module 10, a battery 30, a load device 40, and a scanning control device 50. In FIG. 1, a connection line through which electric power is transmitted is indicated by a thick solid line, and a connection line through which control signals, detection values, and the like other than electric power are transmitted and received is indicated by a dotted line. The solar charging system 1 can be mounted on vehicles such as, for example, hybrid electric vehicle (HEV), plug-in hybrid electric vehicle (PHEV), and battery electric vehicle (BEV).

The solar module 10 is a power generation device that generates electric power by being irradiated with sunlight. The solar module 10 can output the generated electric power to the battery 30, the load device 40, or the like connected to the solar module 10. The solar module 10 includes a solar panel 11, a DCDC converter 12, a sensor 13, and a control unit 14.

In FIG. 1, an example in which the solar charging system 1 includes only one solar module 10 has been described. However, the solar charging system 1 may include two or more solar modules.

The solar panel 11 is a device capable of generating electric power according to the irradiation amount of sunlight, and is typically an aggregate of solar cells. In the case of a vehicle, the solar panel 11 is installed in a roof, a bonnet, a back door, a trunk, a window, or the like. In the case where there is a plurality of solar panels, the solar panels may be arranged side by side in a planar manner, or may be arranged in a three-dimensional manner in a superimposed manner.

DCDC converter 12 is configured to control power generation of the solar panel 11. DCDC converter 12 is a power converter for inputting electric power generated by the solar panel 11, converting the input electric power into a predetermined voltage, and outputting the voltage. DCDC converter 12 performs control such as converting and outputting generated electric power in accordance with control (instruction) from the control unit 14. The power of DCDC converter 12 is supplied to the battery 30 and the load device 40.

The sensor 13 is a configuration for acquiring a power generation state of the solar panel 11. The sensor 13 can acquire physical quantities such as an output voltage, an output current, a temperature, and generated electric power of the solar panel 11 as a power generation state of the solar panel 11. Various detection elements such as a voltage sensor, a current sensor, and a temperature sensor may be used for the sensor 13. Note that the sensor 13 may be integrally formed with the solar panel 11.

The control unit 14 is a configuration for controlling the operation of DCDC converter 12. The control unit 14 controls (and instructs) DCDC converter 12 based on the power generation status of the solar panel 11 acquired by the sensor 13. The control includes control for outputting a voltage command for generating power to DCDC converter 12, and MPPT control for executing a scanning process for finding a maximum power point of the solar panel 11. A well-known technique can be used for MPPT control of the present embodiment. The control unit 14 constitutes a power generation control unit that controls power generation of the solar panel 11 together with the above-described DCDC converter 12.

The battery 30 is a secondary battery configured to be chargeable and dischargeable, such as a lithium ion battery or a lead storage battery. The battery 30 is connected to the solar module 10, and is configured to be able to charge electric power generated by the solar panel 11 via DCDC converter 12.

The load device 40 is connected to the battery 30, and is a variety of devices that operate with electric power supplied from the battery 30.

The scanning control device 50 monitors the power generation status of the solar panel 11 in the solar module 10 and suitably controls the scanning process of MPPT control that is executed by DCDC converter 12. The scanning control device 50 is typically configured as an electronic control unit (Electronic Control Unit, ECU) including a processor, a memory, and an input/output interface, and the processor reads and executes a program stored in the memory to realize the functions of the acquisition unit 51, the setting unit 52, and the instruction unit 53 described below.

The acquisition unit 51 acquires information related to power generation of the solar panel 11. Examples of the information regarding the power generation of the solar panel 11 include information regarding the current power generation status (voltage, current) of the solar panel 11, information regarding the temperature of the solar panel 11, information regarding the past power generation status of the solar panel 11, and information regarding the environment including at least the position where the solar panel 11 is present and the weather at that position. Details of these pieces of information will be described later.

The setting unit 52 sets the target power, which is the target value of the power generated by the solar panel 11, based on the information on the power generation of the solar panel 11 acquired by the acquisition unit 51. Further, the setting unit 52 can reset the target power set based on the information related to the power generation of the solar panel 11 based on the power actually generated by the solar panel 11. Details of the method of setting the target power by the setting unit 52 will be described later.

The instruction unit 53 instructs the solar module 10 to permit or prohibit the execution of the scanning process based on whether the solar panel 11 is generating power near the target power set by the setting unit 52. Details of the execution control of the scanning process by the instruction unit 53 will be described later.

In the above-described configuration example, the solar module 10 and the scanning control device 50 are described as separate configurations, but the solar module 10 and the scanning control device 50 may be integrated. Further, the control function realized by the scanning control device 50 is not limited to the above-described division of the respective blocks of the acquisition unit 51, the setting unit 52, and the instruction unit 53, and the division thereof can be arbitrarily set.

Control

Figure 2:
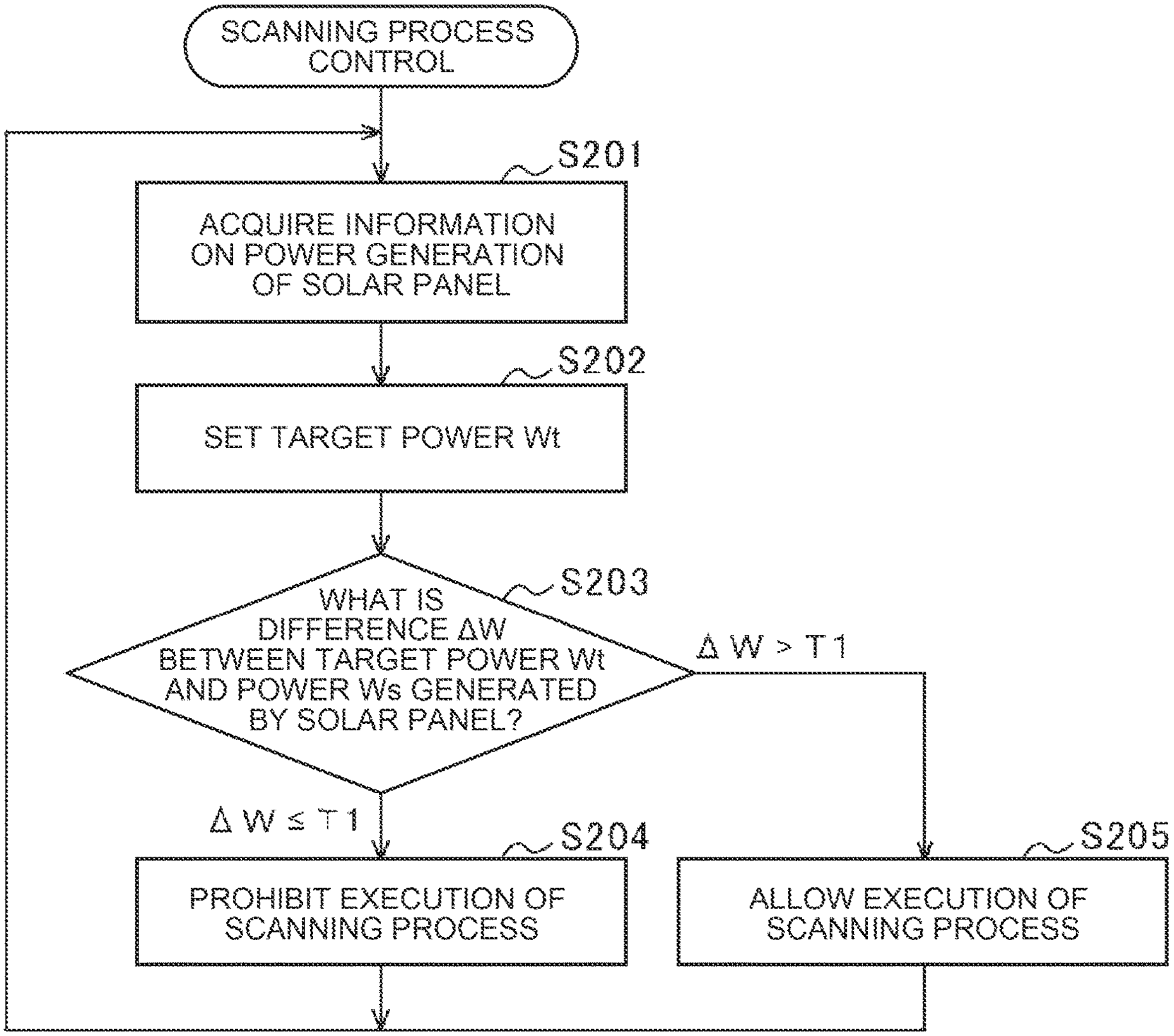
FIG. 2 is a flowchart of scanning process control that is performed by the scanning control device.

With further reference to FIG. 2, the control that is performed in the solar charging system 1 will be described. FIG. 2 is a flowchart illustrating a scanning process control procedure executed by the scanning control device 50 according to the present embodiment. The scanning process control illustrated in FIG. 2 is started, for example, when the solar charging system 1 is activated, and is repeatedly executed until the solar charging system 1 is stopped.

S201

The acquisition unit 51 of the scanning control device 50 acquires information related to power generation of the solar panel 11. In addition to the current power generation status of the solar panel 11, the acquisition unit 51 acquires, for example, information on the temperature of the solar panel 11, information on the past power generation status (power generation performance) by the solar panel 11, and/or information on the environment including the position where the solar panel 11 is present, the weather at the position, and the like, as information on the power generation of the solar panel 11.

The current power generation status (voltage, current) and temperature of the solar panel 11 may be acquired from the sensor 13 or the like. The past power generation status by the solar panel 11 may indicate, as an example, the actual maximum generated power, the average generated power, the total generated power amount, and the like (time unit, day unit, and the like) collected so far. A storage unit (not shown) included in the solar module 10 or the scanning control device 50 may store information on the past power generation status. The position where the solar panel 11 is present can be, for example, a position of the vehicle (a traveling place, a parking place, or the like) when the solar charging system 1 is mounted on the vehicle. The information on the position of the vehicles and the weather at the position thereof may be acquired from a navigation device equipped with a GPS function, a predetermined external facility (information center, server, or the like), or the like.

When the acquisition unit 51 acquires information regarding the power generation of the solar panel 11, the process proceeds to S202.

S202

The setting unit 52 of the scanning control device 50 sets the target power Wt to be generated in the solar panel 11 based on the data related to the power generation of the solar panel 11 acquired by the acquisition unit 51.

For example, when a map or an arithmetic expression indicating the relation between the panel temperature and the maximum power that can be output is stored in advance for the solar panel 11, the setting unit 52 can set the maximum power derived from the map or the arithmetic expression based on the temperature of the solar panel 11 as the target power Wt. In addition, for example, when data related to the past power generation status of the solar panel 11 is cumulatively stored, the setting unit 52 can set the electric power derived based on the past power generation status that approximates the present situation as the target power Wt. The solar charging system 1 may store the above-described maps, arithmetic expressions, and data. Further, for example, when the environment information on the change in the weather at the parking location of the vehicle can be received from an external information center, the setting unit 52 can set the electric power derived by coordinating the environment information with the information on the temperature of the solar panel 11 and information on the past power generation status as the target power Wt.

Further, the setting unit 52 can reset the target power Wt when the difference ΔW(=Wt−Ws) between the set target power Wt and the power Ws generated by the solar panel 11 is larger than a predetermined first threshold value T1 and when the power generated by the solar panel 11 is stable in a predetermined condition. More specifically, when the difference ΔW of the power is larger than the first threshold value T1, if the state in which the fluctuation value of the power generated by the solar panel 11 (fluctuation from the maximum power Wmax to the minimum power Wmin) is equal to or less than the predetermined second threshold value T2 (Wmax−Wmin≤T2), that is, the stable power generation state in which the fluctuation value of the power is small continues for a predetermined period, the setting unit 52 resets the target power Wt. Examples of the target power Wt after the setting are the averaged value of the power generated by the solar panel 11 in a predetermined period, the median value ((Wmax+Wmin)/2) of the maximum power Wmax and the minimum power Wmin of the solar panel 11, and the like.

When the target power Wt generated by the solar panel 11 is set by the setting unit 52, the process proceeds to S203.

Note that the above-described S201 and S202 processes may be executed at all times while the solar charging system 1 is in operation, or may be executed based on predetermined timings (a certain period, when a particular event occurs, or the like).

S203

The instruction unit 53 of the scanning control device 50 determines whether or not the solar panel 11 is generating electric power at an output close to the target power Wt set by the setting unit 52. More specifically, the instruction unit 53 determines whether the difference ΔW between the target power Wt and the power Ws generated by the solar panel 11 is larger or smaller than the first threshold value T1.

When the instruction unit 53 determines that the difference ΔW of the electric power is equal to or less than the first threshold value T1 (S203, ΔW≤T1), the process proceeds to S204. The transition to S204 may be performed only when the power difference ΔW is equal to or less than the first threshold value T1 (ΔW≤T1) continues for a predetermined time (for example, several seconds). On the other hand, when the instruction unit 53 determines that the difference ΔW of the electric power is larger than the first threshold value T1 (S203, ΔW>T1), the process proceeds to S205.

S204

The instruction unit 53 of the scanning control device 50 instructs the solar module 10 to prohibit the execution of the scanning process of the solar panel 11 (non-permission of the execution). According to this instruction, even when the timing at which the scanning process is to be executed comes, the scanning process is not executed in the solar module 10.

When the instruction unit 53 instructs the solar module 10 to prohibit the execution of the scanning process of the solar panel 11, the process proceeds to S201.

S205

The instruction unit 53 of the scanning control device 50 instructs the solar module 10 to permit the solar panel 11 to execute the scanning process. According to this instruction, when the timing at which the scanning process is to be executed arrives, the scanning process is executed in the solar module 10.

When the instruction unit 53 instructs the solar module 10 to execute the scanning process of the solar panel 11, the process proceeds to S201.

Operations and Effects

As described above, according to the scanning control device according to the embodiment of the present disclosure, the target power generated by the solar panel to be set in order to realize efficient power generation is dynamically changed in accordance with the change in the information related to the power generation of the solar panel.

By this control, it is possible to suppress the occurrence of a deviation between the actual generated power of the solar panel and the target power in the ideal power generation environment, and it is possible to reduce the frequency at which the scanning process is executed in the ideal power generation environment. Therefore, according to the scanning control device of the present embodiment, it is possible to improve the power generation efficiency of the entire solar charging system (improvement of controllability and improvement of power generation amount).

Although an embodiment of the present disclosure has been described above, the present disclosure can be regarded as a scanning control device, a solar charging system including a scanning control device, a method executed by the scanning control device, a program for executing the method, a computer-readable non-transitory recording medium storing the program, a vehicle equipped with a solar charging system including a scanning control device, and the like.

The scanning control device of the present disclosure can be used in a solar charging system, or the like mounted on a vehicle.

What is claimed is:

1. A scanning control device that controls a scanning process in a solar module, the solar module including a solar panel and a power generation control unit configured to control power generation of the solar panel, and the scanning process being a process in which the power generation control unit scans an output voltage of the solar panel to find a maximum power point, the scanning control device comprising circuitry configured to:

acquire information on the power generation of the solar panel;

set target power based on the information on the power generation, the target power being a target value of power that is generated by the solar panel;

allow the power generation control unit to execute the scanning process when a difference between the target power and power generated by the solar panel is larger than a first threshold value;

prohibit the power generation control unit from executing the scanning process when the difference is equal to or less than the first threshold value; and change the target power according to a change in the information on the power generation.

2. The scanning control device according to claim 1, wherein the information on the power generation includes information on a temperature of the solar panel.

3. The scanning control device according to claim 1, wherein the information on the power generation includes information on a past power generation status of the solar panel.

4. The scanning control device according to claim 1, wherein the information on the power generation includes information on an environment including at least a location where the solar panel is present and weather at the location.

5. The scanning control device according to claim 1, wherein the circuitry is further configured to, when a state in which the difference is larger than the first threshold value and a fluctuation value of the power generated by the solar panel is equal to or less than a second threshold value continues for a predetermined period, set an average value or median value of the power generated by the solar panel in the predetermined period to the target power.

6. The scanning control device according to claim 1, wherein the circuitry is further configured to determine a difference between the target power and power generated by the solar panel.

* * * * *